United States Patent
Krynski et al.

(10) Patent No.: US 10,302,021 B2
(45) Date of Patent: May 28, 2019

(54) DETECTION OF UNCOMMANDED AND UNCONTROLLABLE HIGH THRUST EVENTS

(71) Applicant: PRATT & WHITNEY CANADA CORP., Longueuil (CA)

(72) Inventors: Michael Krynski, Waterdown (CA); Poi Loon Tang, Montreal (CA); David Mathews, Toronto (CA); Antwan Shenouda, Mississauga (CA); Yusuf Syed, Oakville (CA)

(73) Assignee: PRATT & WHITNEY CANADA CORP., Longueuil (CA)

(*) Notice: Subject to any disclaimer, the term of this patent is extended or adjusted under 35 U.S.C. 154(b) by 73 days.

(21) Appl. No.: 15/585,464

(22) Filed: May 3, 2017

(65) Prior Publication Data
US 2018/0320599 A1    Nov. 8, 2018

(51) Int. Cl.
| | |
|---|---|
| *F02C 9/28* | (2006.01) |
| *F02C 9/44* | (2006.01) |
| *F01D 21/14* | (2006.01) |
| *F01D 21/02* | (2006.01) |
| *F02C 9/00* | (2006.01) |

(52) U.S. Cl.
CPC .............. *F02C 9/28* (2013.01); *F01D 21/02* (2013.01); *F01D 21/14* (2013.01); *F02C 9/00* (2013.01); *F02C 9/44* (2013.01); *F05D 2270/021* (2013.01); *F05D 2270/051* (2013.01)

(58) Field of Classification Search
CPC ........ F02C 9/28; F02C 9/44; F05D 2270/051; F05D 2270/021
See application file for complete search history.

(56) References Cited

U.S. PATENT DOCUMENTS

| | | | |
|---|---|---|---|
| 6,578,794 B1 | 6/2003 | Clark et al. | |
| 6,655,126 B2 | 12/2003 | Walker et al. | |
| 6,704,630 B2 | 3/2004 | Ostrom et al. | |
| 7,184,865 B2 | 2/2007 | Mangelsdorf | |
| 8,954,228 B2 | 2/2015 | Falkmann et al. | |
| 9,470,152 B2 | 10/2016 | MacDonald et al. | |
| 9,932,906 B2 | 4/2018 | Xiong et al. | |
| 2015/0219528 A1 | 8/2015 | Djelassi | |
| 2016/0265445 A1 | 9/2016 | Fiedler et al. | |
| 2017/0081974 A1* | 3/2017 | Xiong ........................ | F02C 9/28 |
| 2018/0057184 A1* | 3/2018 | Jackowski ............. | B64D 31/06 |

FOREIGN PATENT DOCUMENTS

FR          2996254          4/2014

* cited by examiner

*Primary Examiner* — Toan M Le
(74) *Attorney, Agent, or Firm* — Norton Rose Fulbright Canada LLP

(57) ABSTRACT

Herein provided are methods and systems for detecting an uncommanded or uncontrollable high thrust (UHT) event in an aircraft, comprising arming a UHT function, comparing an engine fan speed to a reference target and detecting a first condition when a first threshold is exceeded, comparing a rate of change of a high pressure rotor speed to a reference deceleration schedule and detecting a second condition when a second threshold is exceeded, detecting a UHT event based on excess thrust when the first condition and the second condition are detected, and accommodating the UHT event.

20 Claims, 8 Drawing Sheets

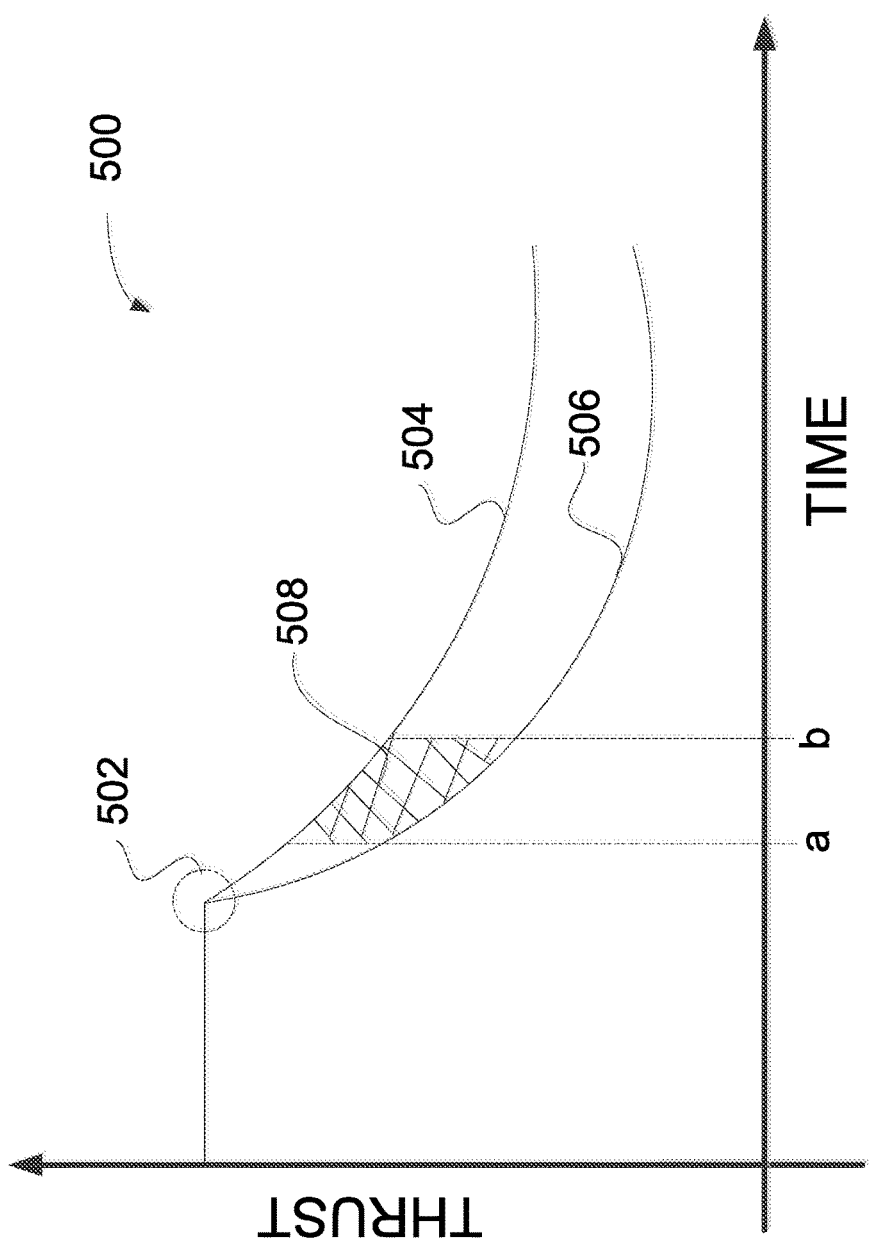

DETECTION OF UNCOMMANDED AND UNCONTROLLABLE HIGH THRUST EVENTS

TECHNICAL FIELD

The present disclosure relates generally to the detection of failures to a thrust control system of an engine resulting in an uncommanded and/or uncontrollable high thrust event.

BACKGROUND OF THE ART

A failure to the thrust control system of an aircraft's gas turbine engine can result in an uncommanded or uncontrollable high thrust (UHT) event. During certain critical flight phases, this can lead to hazardous situations. For example, during landing or takeoff, a UHT event may cause the aircraft to depart laterally or off the end of the runway.

Pilots have high workloads and reacting to a UHT event requires split second decision making during the critical flight phases. Therefore, there is a need to provide automatic detection and accommodation of UHT in conjunction with a declared intention of the pilot to command low thrust.

SUMMARY

In one aspect, there is provided a method for detecting an uncommanded or uncontrollable high thrust (UHT) event in an aircraft. The method comprises arming a UHT function, comparing an engine fan speed to a reference target and detecting a first condition when a first threshold is exceeded, comparing a rate of change of a high pressure rotor speed to a reference deceleration schedule and detecting a second condition when a second threshold is exceeded, detecting a UHT event based on excess thrust when the first condition and the second condition are detected, and accommodating the UHT event.

In another aspect, there is provided a system for detecting an uncommanded or uncontrollable high thrust (UHT) event in an aircraft. The system comprises at least one processing unit and a non-transitory computer-readable memory having stored thereon program instructions. The instructions are executable by the at least one processing unit for arming a UHT function, comparing an engine fan speed to a reference target and detecting a first condition when a first threshold is exceeded, comparing a rate of change of a high pressure rotor speed to a reference deceleration schedule and detecting a second condition when a second threshold is exceeded, detecting a UHT event based on excess thrust when the first condition and the second condition are detected, and accommodating the UHT event.

In a further aspect, there is provided a non-transitory computer readable medium having stored thereon program code executable by a processor for detecting an uncommanded or uncontrollable high thrust (UHT) event in an aircraft. The program code comprises instructions configured for arming a UHT function, comparing an engine fan speed to a reference target and detecting a first condition when a first threshold is exceeded, comparing a rate of change of a high pressure rotor speed to a reference deceleration schedule and detecting a second condition when a second threshold is exceeded, detecting a UHT event based on excess thrust when the first condition and the second condition are detected, and accommodating the UHT event.

DESCRIPTION OF THE DRAWINGS

Reference is now made to the accompanying figures in which:

FIG. 5A is a first graph illustrating net thrust over time to determine an estimated excess thrust impulse in accordance with a first embodiment;

It will be noted that throughout the appended drawings, like features are identified by like reference numerals.

DETAILED DESCRIPTION

There is described herein detection methods and systems for uncommanded or uncontrollable high thrust (UHT) events. A UHT event is defined as a failure to respond to a low thrust command on the part of the engine, thus resulting in excess thrust relative to the command. Many types of failures may result in a UHT event, such as but not limited to an erroneous thrust lever angle (TLA) signal, an erroneous sensor signal used to compute a fuel request, a failure in an electronic circuit driving a fuel metering unit (FMU), a failure in the FMU, and an erroneous central processing unit/uncovered processor failure.

Detection of the UHT event occurs in two steps. In a first step, an abnormal engine response is differentiated from other engine responses using two conditions. The two conditions may be detected simultaneously or sequentially, with no specific order to which is detected first and which is detected second. The first condition relates to the engine's actual fan speed (N1), and more specifically, whether N1 exceeds an N1 reference target by a threshold value. If so, the first condition is met. The second condition relates to the rate of change of the speed of a high pressure (HP) rotor of the engine, or N2DOT. When an engine deceleration is commanded, an engine controller controls fuel flow such that the rate of change of the HP rotor speed follows a prescribed deceleration schedule. If the engine's actual N2DOT is greater than the prescribed N2DOT schedule by more than a threshold value, the second condition is met.

Detection of the first and second conditions acts as a trigger for the second step of UHT detection. In the second step, a determination is made as to whether excess thrust is large enough to require accommodation. Further details are provided below.

Figure 1:
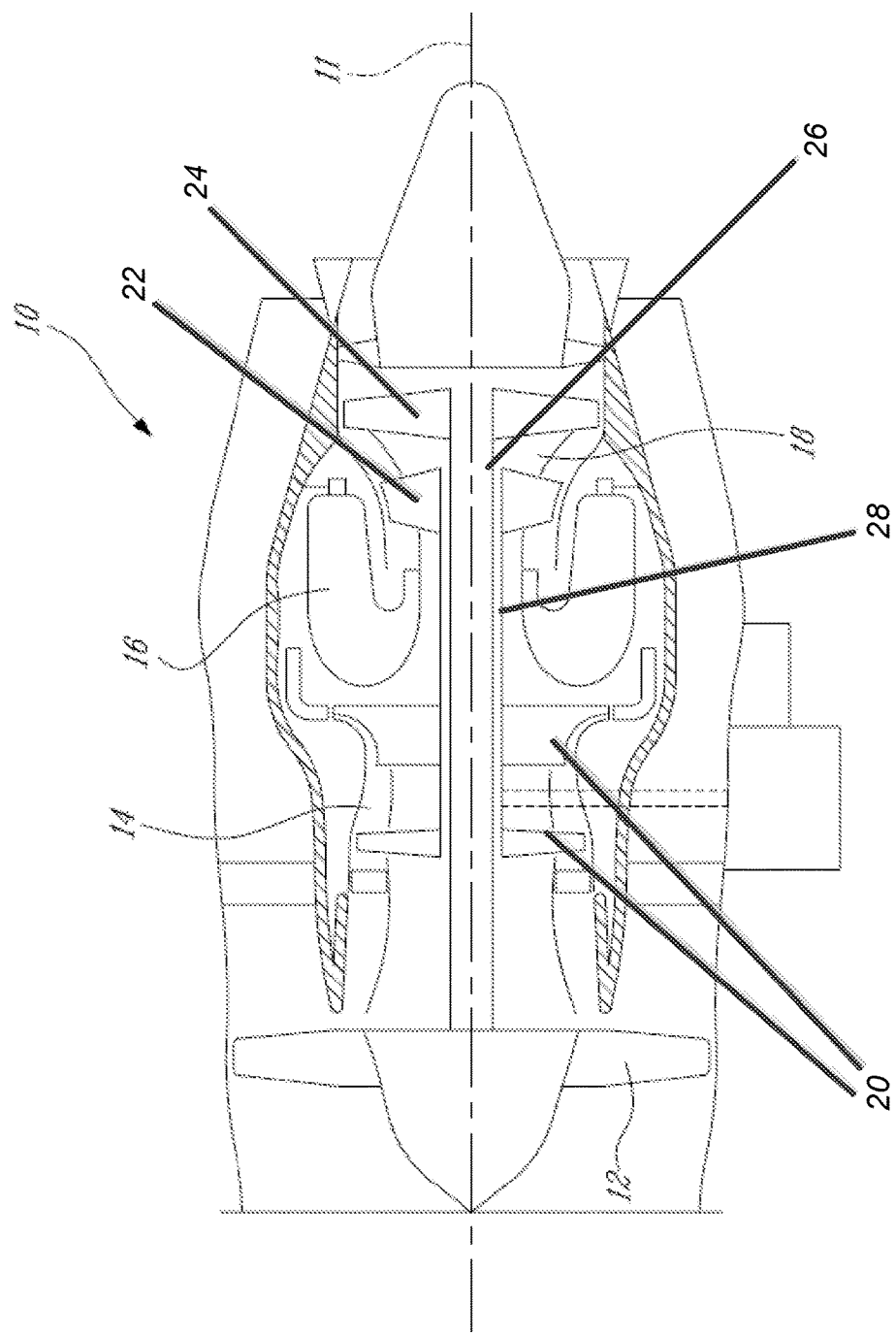
FIG. 1 is a schematic cross-sectional view of an example engine of an aircraft.

FIG. 1 illustrates a gas turbine engine 10 to which the detection methods and systems described herein may be applied. Note that while engine 10 is a turbofan engine, the detection methods and systems may be applicable to turboprop, turbo shaft, and other types of aircraft engines.

Engine 10 generally comprises in serial flow communication: a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. Axis 11 defines an axial direction of the engine 10.

The engine 10 has a high pressure spool, defined by a high pressure compressor rotor 20, a high pressure turbine rotor 22, and a high pressure shaft 28. The engine 10 also has a low pressure spool, defined by a low pressure turbine rotor 24 and a low pressure shaft 26. In some embodiments, the engine also comprises a low pressure compressor rotor (not shown).

Figure 2:
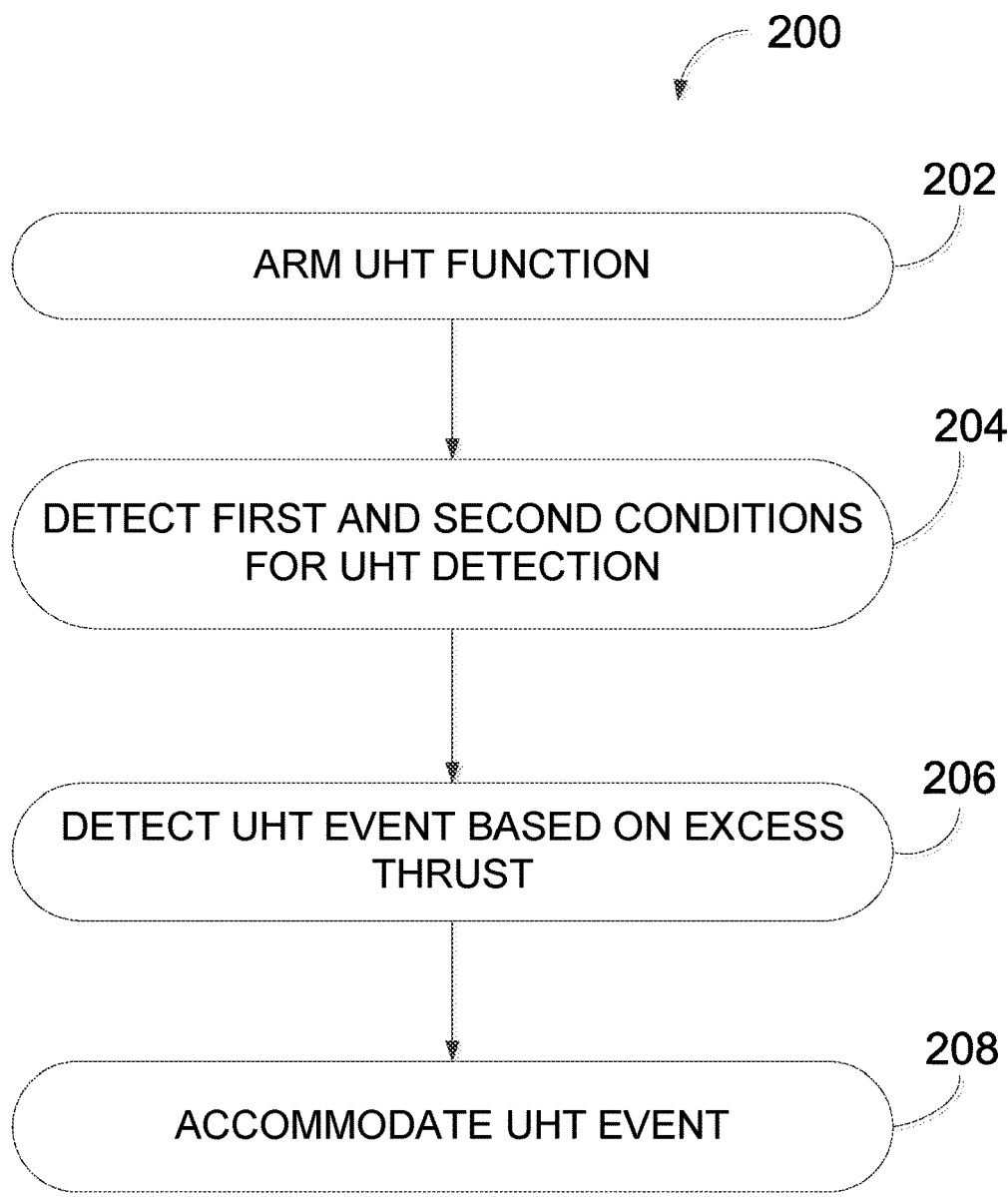
FIG. 2 is a flowchart illustrating an example embodiment of the method for detecting a UHT event.

Referring to FIG. 2, there is illustrated an example embodiment of a method 200 for detecting a UHT event in an aircraft comprising an engine such as engine 10 of FIG. 1. At step 202, the UHT function is armed. In some embodiments, arming the UHT function is conditional on detecting that the aircraft is in a critical flight phase. For example, the aircraft is on the ground, or in an approach phase below a certain altitude. In some embodiments, any one of these scenarios will arm the UHT function. Alternatively or in combination therewith, another condition for arming the UHT function is that the pilot has commanded low or reverse thrust, for example with a TLA at idle or below. In some embodiments, the aircraft operates with two or more engines and another condition for arming the UHT function is that a remote engine of the aircraft is operative. In other words, the aircraft is not in a scenario where there are two engines and only one of the engines is operative. This ensures that in a pre-existing one engine inoperative (OEI) scenario, the UHT function would not be armed. In some embodiments, the UHT function is armed only when the aircraft is in a critical flight phase, the aircraft is below a certain altitude, and a remote engine is operative. Note that in some embodiments, if at any time while method 200 is performed the arming conditions are no longer true, the method 200 aborts or returns to step 202 of arming the UHT function.

Figure 3:
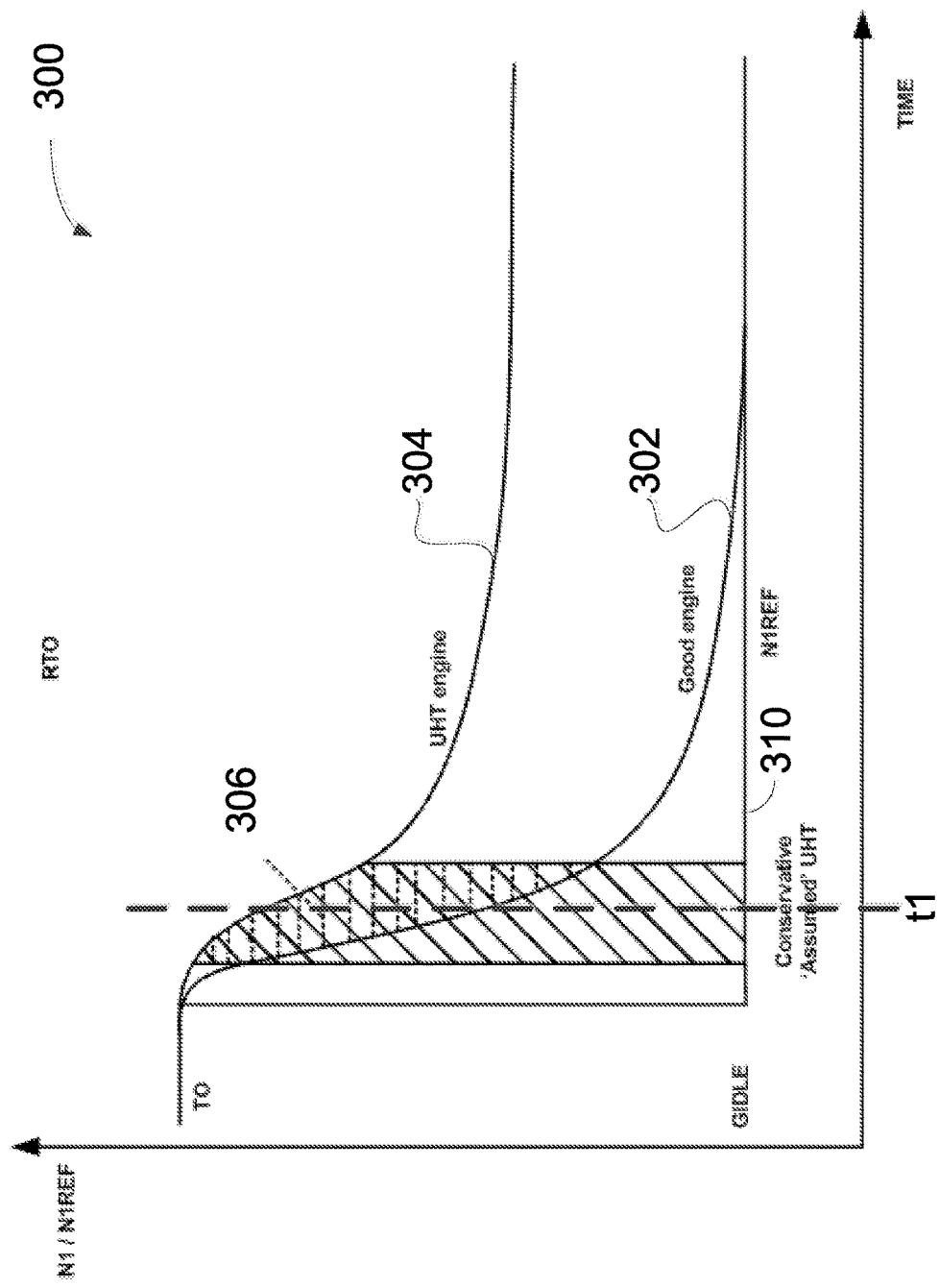
FIG. 3 is an example graph illustrating engine fan rotational speed versus time to determine a first condition for UHT detection.

At step 204, first and second UHT conditions are detected. FIG. 3 illustrates a graph 300 of N1 versus time showing an example scenario for detecting the first condition. In the example illustrated, curve 302 represents the behaviour of a normal engine while curve 304 represents the behavior of an engine possibly undergoing a UHT event (referred to herein as a UHT engine). Also shown is curve 310, which represents a pilot command for N1 and is used as a reference curve. N1 slows down at a significantly faster rate for the normal engine than it does for the UHT engine. The N1 reference curve 310 is used as a reference target to gauge the deviation of the UHT engine N1 speed from the commanded value. The difference in speeds between the normal engine curve 302 and the N1 reference curve 310 is represented by the shaded region 306. Note that in the present case, the "difference" refers to curve 304 minus curve 310. When the difference in N1 reaches a threshold, which occurs a time t1, the first condition is met. In some embodiments, curve 302 is used as a reference target instead of curve 310.

Figure 4:
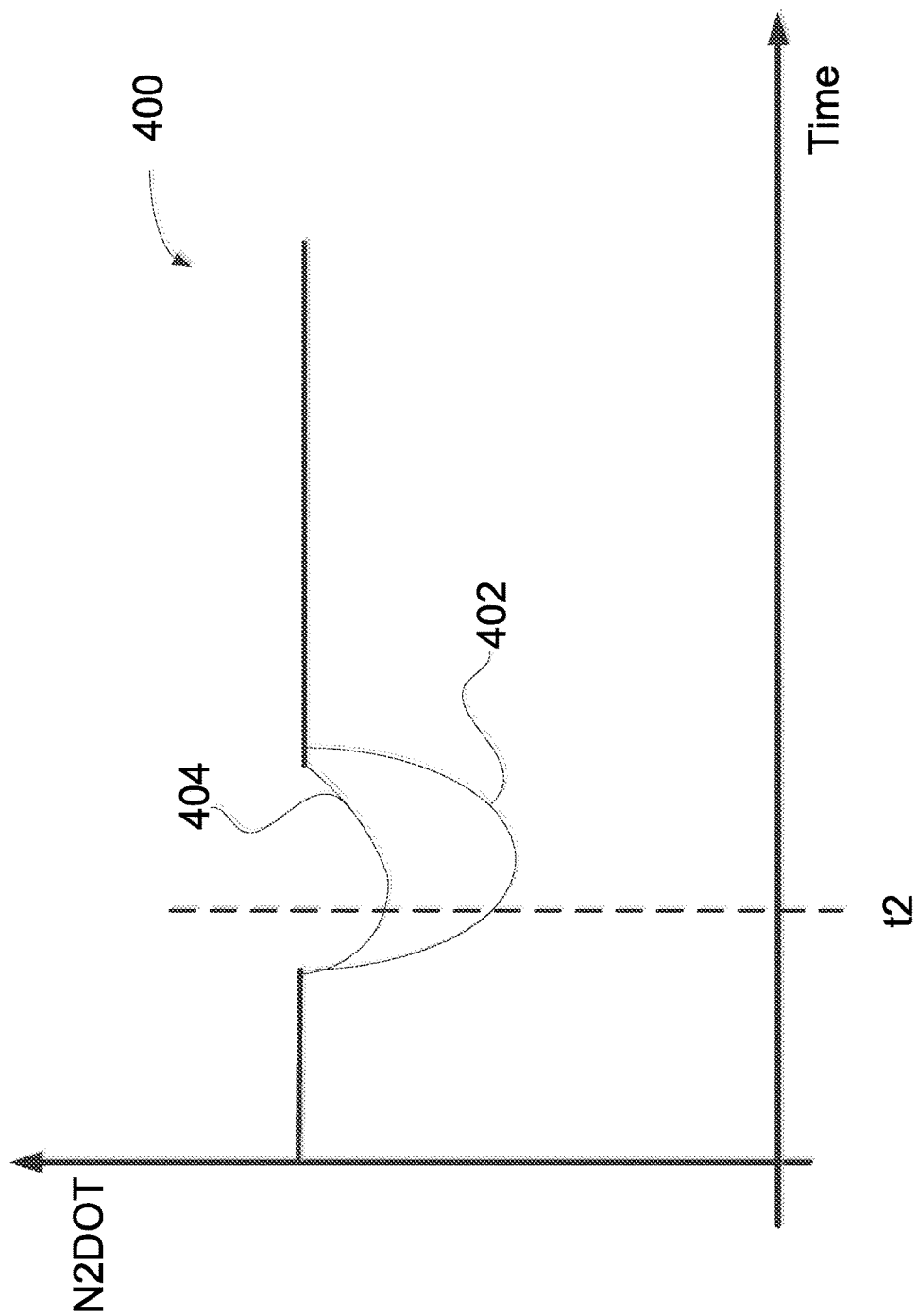
FIG. 4 is an example graph illustrating rate of change of the speed of an HP rotor versus time to determine a second condition for UHT detection.

FIG. 4 illustrates a graph 400 of N2DOT versus time showing an example scenario for detecting the second condition. In the example illustrated, curve 402 represents the behavior of a normal engine while curve 404 represents the behavior of a UHT engine. A reference deceleration schedule may be used to gauge the deviation of the UHT engine N2DOT from an expected value. Note that the values for the N2DOT deceleration schedule are negative. The lower the N2DOT value, the faster the deceleration. If the engine's actual N2DOT is greater than the prescribed N2DOT schedule, it implies that the engine is not decelerating fast enough, and possibly experiencing a UHT event. When the difference between the normal engine curve 402 and the reference deceleration schedule reaches a threshold, at time t2, the second condition is met. Note that in the present case, the "difference" refers to curve 404 minus the deceleration schedule. In some embodiments, the N2DOT reference deceleration schedule is dynamic, i.e. it changes as a function of various aircraft and/or engine conditions. Therefore, the threshold 408 may also be dynamic. In some embodiments, curve 402 is used as a reference target instead of the reference deceleration schedule.

Detecting of both the first condition and the second condition triggers the next step in the method 200. Referring back to FIG. 2, at step 206, the UHT event is detected based on the excess thrust.

Figure 5B:
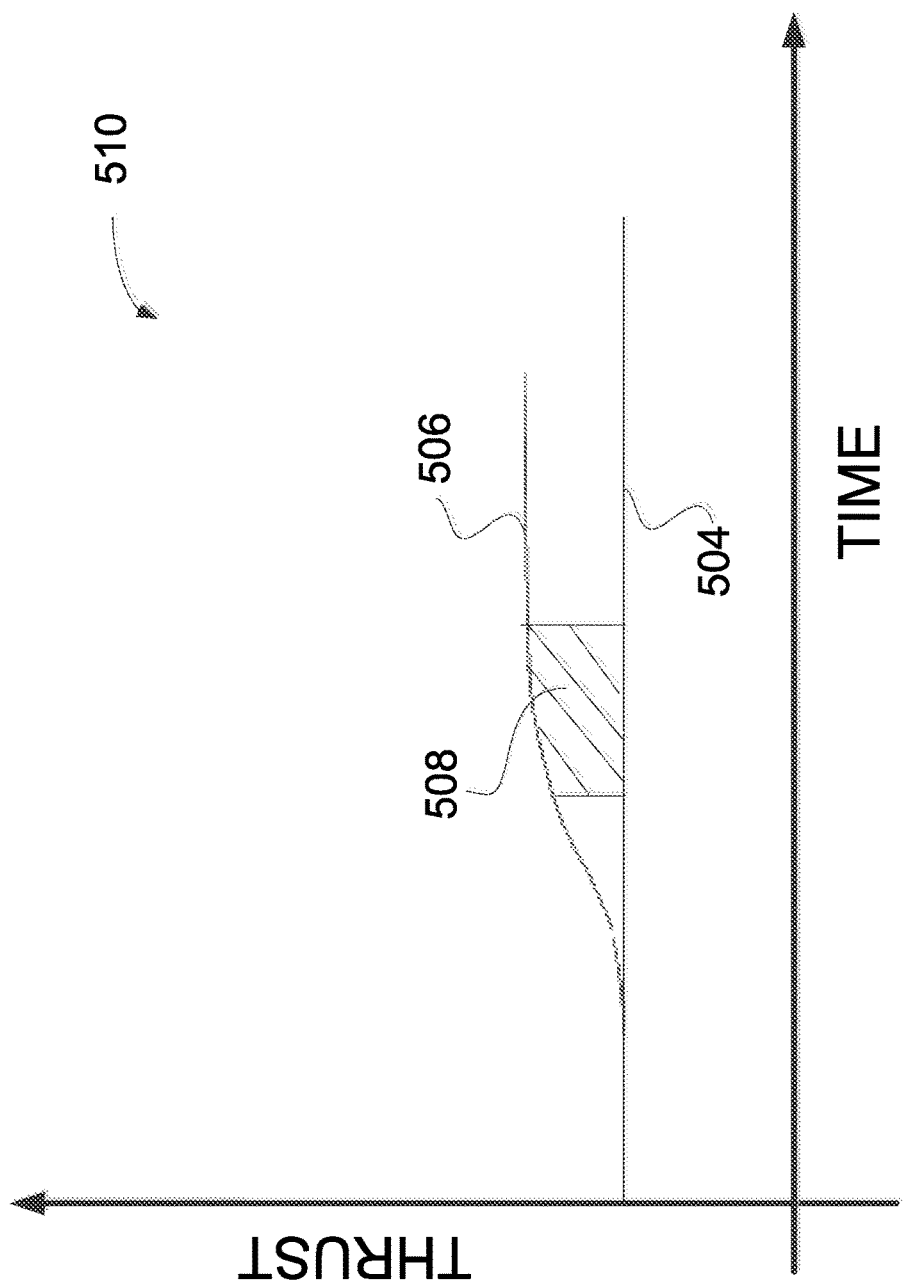
FIG. 5B is a second graph illustrating net thrust over time to determine an estimated excess thrust impulse in accordance with a second embodiment.

Referring to FIG. 5A, graph 500 presents thrust of the engine, such as engine 10, over time for both an actual thrust 504 and a reference thrust 506 in accordance with a first embodiment. The actual thrust is the thrust applied by an engine. In a normally behaving engine, the actual thrust will lag the reference thrust during transient manoeuvres, such as slam acceleration and deceleration, by some time. In steady state operation, both the reference thrust and the actual thrust should be approximately equal. Graph 510 of FIG. 5B presents thrust over time in accordance with a second embodiment. Note that the thrust values are estimated using various engine parameters as there is no thrust measurement system per se in an aircraft.

In the first part of both curves, there is no discrepancy between actual net thrust 504 and reference net thrust 506. At the point of inflection 502, the actual net thrust 504 begins to deviate from the reference net thrust 506. Over time, the difference between the actual net thrust 504 and the reference net thrust 506 increases. The difference between the actual net thrust 504 and the reference net thrust 506 corresponds to the estimated excess thrust. The estimated excess thrust is integrated over a fixed period of time to determine an estimated excess thrust impulse:

$$\text{Estimated Excess Thrust Impulse} = \int_a^b \text{Estimated Excess Thrust } dt$$

The estimated excess thrust impulse thus corresponds to the hatched portion 508 between the two curves representing actual thrust 504 and reference thrust 506, and is an estimate of the excess thrust that is supplied by the engine over a period of time. The estimated excess thrust impulse is compared to a predetermined or dynamic UHT detection threshold. If the value exceeds the threshold, UHT is latched and accommodations are triggered. There can also be other conditions required for accommodation. By considering excess thrust impulse instead of only excess thrust, smaller excess thrust amounts that last for longer periods of time may be detected, contrary to other methods. In some embodiments, the estimated excess thrust is integrated over a time duration that is dynamic, based on aircraft configuration, flight phase, pilot command, and other factors.

In some embodiments, the UHT detection threshold is set to a value above which aircraft safety is compromised. A buffer may be added for additional safety. In some embodiments, the UHT detection threshold comprises an upper and a lower limit. The UHT event is detected when the estimated excess thrust impulse exceeds the upper limit, and the estimated excess thrust impulse is reset when thrust impulse falls below the lower limit for a predetermined time period. In some embodiments, the lower limit is dynamic and is controlled by pilot input.

Each aircraft is capable of handling a certain amount of excess thrust. Therefore, the UHT detection threshold is selected based on UHT simulations for a given aircraft model and may vary accordingly. Note that integration begins at time t=a, which corresponds to the time at which the first condition (N1) and the second condition (N2DOT) and other UHT permissives are met. The first and second conditions thus act as a trigger for integrating the estimated excess thrust to determine the estimated excess thrust impulse.

Figure 6:
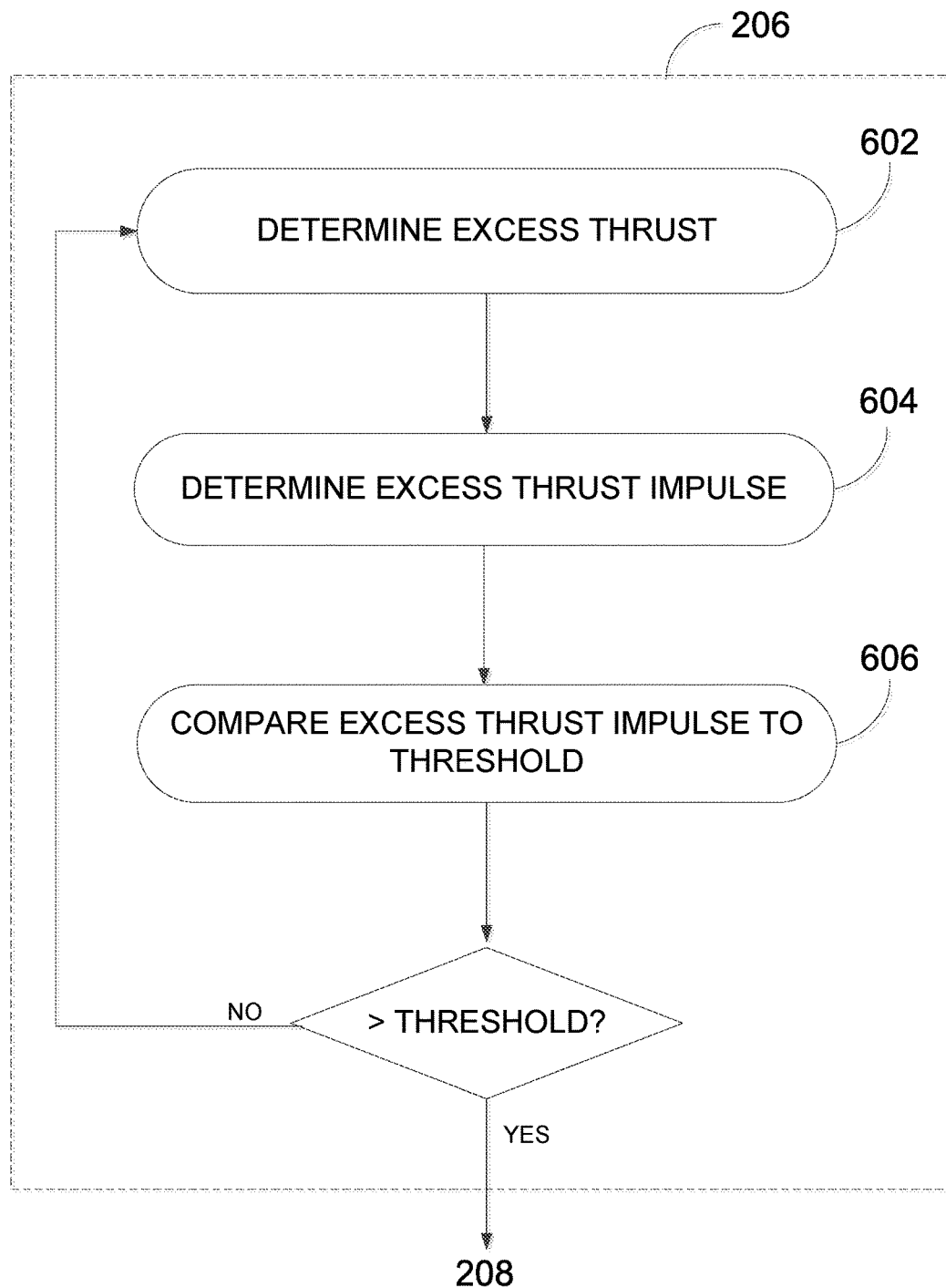
FIG. 6 is a flowchart illustrating an example embodiment of the method for detecting a UHT event based on excess thrust.

FIG. 6 illustrates an example embodiment for detecting the UHT event based on excess thrust. At step 602, a difference between the actual net thrust and the reference net thrust is calculated to find the estimated excess thrust. In some embodiments, actual net thrust is proportional to a rotational speed of the engine and may thus be determined from a measured engine speed. In other embodiments, an engine pressure ratio (EPR) may be used. Similarly, reference net thrust is proportional to a reference engine speed and is a function of the TLA angle. At step 604, the difference between the actual net thrust and the reference net thrust, i.e. the estimated excess thrust, is integrated over a fixed period of time to determine the estimated excess thrust impulse. At step 606, the estimated excess thrust impulse is compared to the UHT detection threshold. When the UHT detection threshold is exceeded, the method 200 moves on to step 208.

At step 208 of FIG. 2, the UHT event is accommodated. There are many known techniques to accommodate UHT events and any one of these may be used. Accommodation may refer to cutting off the fuel flow to the engine and shutting down the engine. Alternatively, accommodation may refer to reducing fuel flow to a minimum amount. The main fuel flow system or a secondary system may be used to perform accommodation. Since UHT events can result from failures affecting the FMU, some embodiments shut off the fuel flow independently from the FMU, for example via an emergency shutoff valve. A command signal may be sent by an engine controller, for example, or any other suitable control system. In some embodiments, the control system has a dual channel architecture and each channel has independent means of detecting and accommodating the UHT event. This may protect against an uncovered processor failure.

In some embodiments, certain conditions will cause the method 200 to disarm the UHT function. For example, if a pilot command requesting a power level higher than idle is detected or if an on/off engine switch is set to off, the UHT function will be disarmed. Similarly, if any of the conditions used to arm the UHT function are no longer true, such as the critical flight phase, the UHT function may be disarmed.

In some embodiments, the thrust integral is reset when any one of certain conditions are met. The thrust integral reset conditions are as follows: (a) the estimated excess thrust impulse falls below a threshold for a duration of time; (b) N1 is below the N1 reference target for a duration of time; (c) [UHT Flight Phase] is false; (d) the pilot requests a power level higher than idle; (d) the first condition regarding N1 is no longer met; (e) the second condition regarding N2DOT is no longer met; or (f) the pilot commands an engine shutdown.

In some embodiments, the thrust integral will be decremented when any one of certain conditions are met. The rate at which the thrust integral is decremented will also be dependent on a range of conditions, some of which are dynamic. The thrust integral decrement conditions are as follows: (a) the estimated excess thrust impulse falls below a threshold for a duration of time; (b) N1 is below the N1 reference target for a duration of time; (c) [UHT Flight Phase] is false; (d) the pilot requests a power level higher than idle; (d) the first condition regarding N1 is no longer met; or (e) the second condition regarding N2DOT is no longer met.

Figure 7:
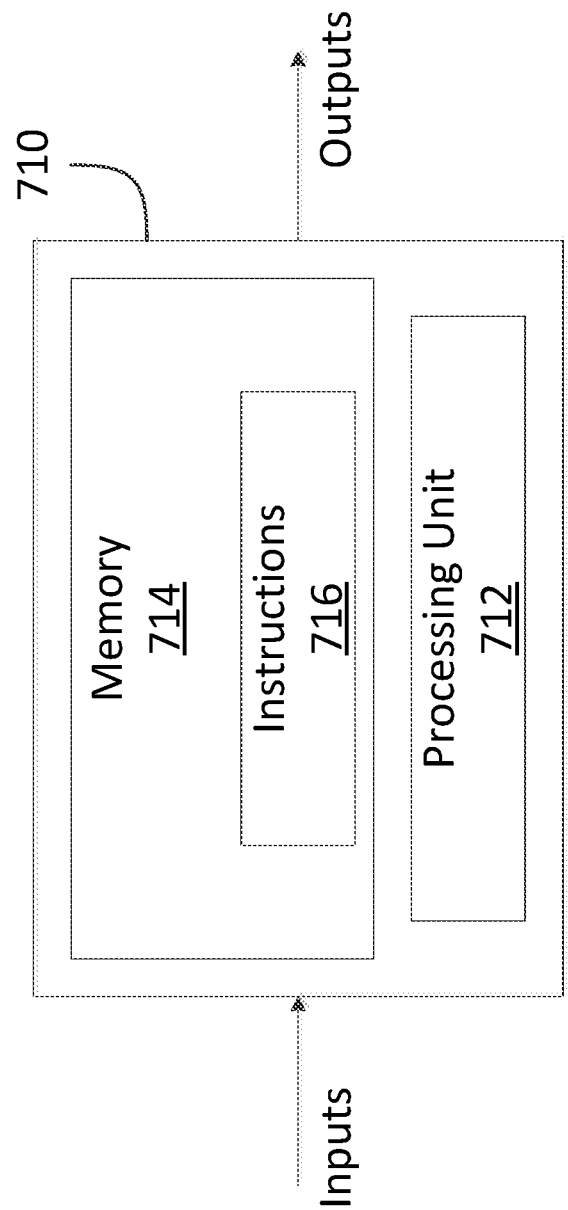
FIG. 7 is a block diagram of an example computing device for implementing the method of detecting a UHT event.

With reference to FIG. 7, the method 200 may be implemented by a computing device 710, comprising a processing unit 712 and a memory 714 which has stored therein computer-executable instructions 716. The processing unit 712 may comprise any suitable devices configured to implement the system such that instructions 716, when executed by the computing device 710 or other programmable apparatus, may cause the functions/acts/steps of the method 200 as described herein to be executed. The processing unit 712 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 714 may comprise any suitable known or other machine-readable storage medium. The memory 714 may comprise non-transitory computer readable storage medium, for example, but not limited to, an electronic, magnetic, optical, electromagnetic, infrared, or semiconductor system, apparatus, or device, or any suitable combination of the foregoing. The memory 714 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 714 may comprise any storage means (e.g., devices) suitable for retrievably storing machine-readable instructions 716 executable by processing unit 712.

In some embodiments, the computing device 710 corresponds to or forms part of one or more full-authority digital engine controls (FADEC), electronic engine controller (EEC) engine control unit (ECU), and other engine control systems.

The methods and systems for detecting a UHT event described herein may be implemented in a high level procedural or object oriented programming or scripting language, or a combination thereof, to communicate with or assist in the operation of a computer system, for example the computing device 710. Alternatively, the methods and systems may be implemented in assembly or machine language. The language may be a compiled or interpreted language. Program code for implementing the methods and systems may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems may also be considered to be implemented by way of a non-transitory computer-readable storage medium having a computer program stored thereon. The computer program may comprise computer-readable instructions which cause a computer, or in some embodiments the processing unit 712 of the computing device 710, to operate in a specific and predefined manner to perform the functions described herein.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure.

Various aspects of the methods and systems for controlling operation of a first propeller of an aircraft may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be obvious to those skilled in the art that changes and modifications may be made without departing from this invention in its broader aspects. The scope of the following claims should not be limited by the embodiments set forth in the examples, but should be given the broadest reasonable interpretation consistent with the description as a whole.

The invention claimed is:

1. A method for detecting an uncommanded or uncontrollable high thrust (UHT) event in an aircraft, the method comprising:
    arming a UHT function associated with a gas turbine engine;
    comparing an engine fan speed of the gas turbine engine to a reference target and detecting a first condition when a first threshold is exceeded;
    comparing a rate of change of a high pressure rotor speed of the gas turbine engine to a reference deceleration schedule and detecting a second condition when a second threshold is exceeded;
    detecting a UHT event based on excess thrust when the first condition and the second condition are detected; and
    in response to detecting the UHT event, outputting an alert to trigger accommodations to the UHT event for the gas turbine engine.

2. The method of claim 1, wherein detecting the UHT event comprises:
    determining an estimated excess thrust as an actual net thrust minus a reference net thrust;
    determining an estimated excess thrust impulse by integrating the estimated excess thrust over a period of time; and
    confirming the UHT event when the estimated excess thrust impulse exceeds a third threshold.

3. The method of claim 2, wherein the actual net thrust is calculated from a measured engine speed, and the reference net thrust is calculated from a reference engine speed as a function of a thrust lever angle position.

4. The method of claim 2, wherein the third threshold comprises an upper and a lower limit, wherein the UHT event is detected when the estimated excess thrust impulse exceeds the upper limit, and the estimated excess thrust impulse is reset when thrust impulse falls below the lower limit for a predetermined time period.

5. The method of claim 2, wherein the estimated excess thrust impulse is reset when the engine fan speed is above the reference target for a predetermined time period.

6. The method of claim 1, wherein arming the UHT function comprises enabling the UHT function when a flight phase of the aircraft corresponds to on ground or in an approach phase, and a thrust lever angle position corresponds to idle or below.

7. The method of claim 6, further comprising disarming the UHT function when the flight phase is no longer on ground or in an approach phase, or the thrust lever angle position is above idle.

8. The method of claim 1, wherein the third threshold is specific to an aircraft model.

9. The method of claim 1, further comprising disarming the UHT function when the first condition or the second condition is no longer detected.

10. A system for detecting an uncommanded or uncontrollable high thrust (UHT) event in an aircraft, the system comprising:
    at least one processing unit; and
    a non-transitory computer-readable memory having stored thereon program instructions executable by the at least one processing unit for:
        arming a UHT function associated with a gas turbine engine;
        comparing an engine fan speed of the gas turbine engine to a reference target and detecting a first condition when a first threshold is exceeded;
        comparing a rate of change of a high pressure rotor speed of the gas turbine engine to a reference deceleration schedule and detecting a second condition when a second threshold is exceeded;
        detecting a UHT event based on excess thrust when the first condition and the second condition are detected; and
        in response to detecting the UHT event, outputting an alert to trigger accommodations to the UHT event for the gas turbine engine.

11. The system of claim 10, wherein detecting the UHT event comprises:
    determining an estimated excess thrust as an actual net thrust minus a reference net thrust;
    determining an estimated excess thrust impulse by integrating the estimated excess thrust over a period of time; and
    confirming the UHT event when the estimated excess thrust impulse exceeds a third threshold.

12. The system of claim 11, wherein the actual net thrust is calculated from a measured engine speed, and the reference net thrust is calculated from a reference engine speed as a function of a thrust lever angle position.

13. The system of claim 11, wherein the third threshold comprises an upper and a lower limit, wherein the UHT event is detected when the estimated excess thrust impulse exceeds the upper limit, and the estimated excess thrust impulse is reset when thrust impulse falls below the lower limit for a predetermined time period.

14. The system of claim 11, wherein the estimated excess thrust impulse is reset when the engine fan speed is above the reference target for a predetermined time period.

15. The system of claim 10, wherein arming the UHT function comprises enabling the UHT function when a flight phase of the aircraft corresponds to on ground or in an approach phase, and a thrust lever angle position corresponds to idle or below.

16. The system of claim 15, further comprising disarming the UHT function when the flight phase is no longer on ground in in an approach phase, or the thrust lever angle position is above idle.

17. The system of claim 10, wherein the third threshold is specific to an aircraft model.

18. The system of claim 10, further comprising disarming the UHT function when the first condition or the second condition is no longer detected.

19. A non-transitory computer readable medium having stored thereon program code executable by a processor for detecting an uncommanded or uncontrollable high thrust (UHT) event in an aircraft, the program code comprising instructions configured for:
   arming a UHT function associated with a gas turbine engine;
   comparing an engine fan speed of the gas turbine engine to a reference target and detecting a first condition when a first threshold is exceeded;
   comparing a rate of change of a high pressure rotor speed of the gas turbine engine to a reference deceleration schedule and detecting a second condition when a second threshold is exceeded;
   detecting a UHT event based on excess thrust when the first condition and the second condition are detected; and
   in response to detecting the UHT event, outputting an alert to trigger accommodations to the UHT event for the gas turbine engine.

20. The non-transitory computer readable medium of claim 19, wherein detecting the UHT event comprises:
   determining an estimated excess thrust as an actual net thrust minus a reference net thrust;
   determining an estimated excess thrust impulse by integrating the estimated excess thrust over a period of time; and
   confirming the UHT event when the estimated excess thrust impulse exceeds a third threshold.

* * * * *